United States Patent
Daiku (10) Patent No.: US 8,168,935 B2
(45) Date of Patent: May 1, 2012

(54) PRESSURE SENSOR AND PRESSURE MEASUREMENT METHOD OF PRESSURE SENSOR

(75) Inventor: Yasuhiro Daiku, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 263 days.

(21) Appl. No.: 12/703,983

(22) Filed: Feb. 11, 2010

(65) Prior Publication Data

US 2010/0213360 A1  Aug. 26, 2010

(30) Foreign Application Priority Data

Feb. 23, 2009  (JP) ................................. 2009-039176

(51) Int. Cl.
  *G01L 1/24*  (2006.01)
(52) U.S. Cl. ...................... 250/214 R; 382/127; 235/454
(58) Field of Classification Search ............. 250/231.19, 250/214 R, 214.1, 221, 208.1, 4, 556; 382/124–127; 235/454

See application file for complete search history.

(56) References Cited

U.S. PATENT DOCUMENTS

| | | | | |
|---|---|---|---|---|
| 6,414,297 B1 | * | 7/2002 | Sasaki et al. ............... | 250/214 R |
| 6,681,992 B2 | * | 1/2004 | Iihama ........................... | 235/454 |
| 7,225,986 B2 | | 6/2007 | Mizutani et al. | |

FOREIGN PATENT DOCUMENTS

| | | |
|---|---|---|
| JP | 61-041938 A | 2/1986 |
| JP | 62-085818 A | 4/1987 |
| JP | 01-296129 A | 11/1989 |
| JP | 2004-272322 A | 9/2004 |

OTHER PUBLICATIONS

Japanese Office Action dated Feb. 8, 2011 (and English translation thereof) in counterpart Japanese Application No. 2009-039176.

* cited by examiner

*Primary Examiner* — Seung C Sohn
(74) *Attorney, Agent, or Firm* — Holtz, Holtz, Goodman & Chick, PC (57) ABSTRACT

Disclosed is a pressure sensor comprising: a substrate; a pressure reception plate which is provided in a state of facing the substrate, the pressure reception plate comprising in a surface which faces the substrate, a low reflection region, and a high reflection region having a relatively higher reflection ratio compared to the low reflection region; a support portion to change a distance between the substrate and the pressure reception plate when a pressure is applied to the pressure reception plate, the support portion being provided in between the substrate and the pressure reception plate; and a plurality of light receiving elements which are respectively provided on the substrate in positions facing the low reflection region and in positions facing the high reflection region, of the pressure reception plate.

15 Claims, 9 Drawing Sheets

| DISTANCE(mm) | OBTAINED IMAGE |
|---|---|
| 0 |  |
| 0.5 |  |
| 1.0 |  |
| 1.5 |  |
| 2.0 |  |
| 2.5 |  |
| 3.0 |  |

PRESSURE SENSOR AND PRESSURE MEASUREMENT METHOD OF PRESSURE SENSOR

BACKGROUND OF THE INVENTION

1. Field of the Invention

The present invention relates to a pressure sensor and a pressure measurement method of the pressure sensor.

2. Description of the Related Art

In recent years, many sensor systems have been developed in accordance with robot engineering and mechatronics systems being in progress. In particular, a technique of a tactile sensor which corresponds to a cutaneous sensation of a human is considered to be significant. The tactile sensor is a pressure sensor such as pressure-sensitive elements, and the like, in a state of being disposed in a matrix. By the tactile sensor, when a pressure is applied to any one of the pressure sensors, a position where the pressure is applied and the pressure measurement are detected (see for example, Japanese Patent Application Laid-Open Publication No. 1-296129).

In this regard, the pressure is preferably detected optically.

Accordingly, the present invention is directed to obtaining an advantage in detecting the pressure optically.

SUMMARY OF THE INVENTION

In order to solve the above described problems, according to an aspect of the present invention, there is provided a pressure sensor comprising:

a substrate;

a pressure reception plate which is provided in a state of facing the substrate, the pressure reception plate comprising in a surface which faces the substrate, a low reflection region, and a high reflection region having a relatively higher reflection ratio compared to the low reflection region;

a support portion to change a distance between the substrate and the pressure reception plate when a pressure is applied to the pressure reception plate, the support portion being provided in between the substrate and the pressure reception plate; and a plurality of light receiving elements which are respectively provided on the substrate in positions facing the low reflection region and in positions facing the high reflection region, of the pressure reception plate.

Preferably, the plurality of light receiving elements are arranged to be in a state of a matrix on the substrate.

Preferably, the pressure reception plate comprises a high reflection member, and the low reflection region comprises a low reflection member.

Preferably, the low reflection region is provided in a circular shape at a center portion of the surface which faces the substrate, in the pressure reception plate.

Preferably, the pressure reception plate comprises a low reflection member, and the high reflection region comprises a high reflection member.

Preferably, an elastic modulus of the pressure reception plate is sufficiently larger than an elastic modulus of the support portion.

Preferably, the pressure sensor further comprises a light source to emit a light to the plurality of light receiving elements, the light source being provided in a surface side where the plurality of light receiving elements are not formed on the substrate.

Preferably, the light source is a surface-emitting light source.

Preferably, the substrate comprises a member having a translucency, and wherein each of the light receiving element comprises:

a first electrode which is formed on the substrate, and which has a light blocking property;

a first insulation film which is formed on the first electrode and which is transparent;

a semiconductor film which is formed on the first insulation film in a state of facing the first electrode;

two impurity semiconductor films which are located separately from each other, both of which being attached to the semiconductor film;

a second electrode which is formed on one of the two impurity semiconductor films;

a third electrode which is formed on the other one of the two impurity semiconductor films;

a second insulation film which is transparent and which covers the semiconductor film, the impurity semiconductor films, the second electrode and the third electrode; and a fourth electrode which is formed on the second insulation film in a state of facing the semiconductor film.

Preferably, the pressure sensor further comprises:

a third insulation film which is transparent and which is formed on the fourth electrode; and a fifth electrode which is transparent and which is formed on the third insulation film.

Preferably, the fifth electrode is grounded.

In order to solve the above described problems, according to another aspect of the present invention, there is provided a pressure measurement method of a pressure sensor, wherein the pressure sensor comprises:

a substrate;

a pressure reception plate which is provided in a state of facing the substrate, the pressure reception plate comprising a low reflection region and a high reflection region, respectively in a surface which faces the substrate;

a support portion to change a distance between the substrate and the pressure reception plate when a pressure is applied to the pressure reception plate, the support portion being provided in between the substrate and the pressure reception plate; and a plurality of light receiving elements which are respectively provided on the substrate in positions facing the low reflection region and in positions facing the high reflection region, of the pressure reception plate, wherein the pressure measurement method comprises:

applying a pressure on the pressure reception plate; and measuring the pressure based on an amount of a light received by the light receiving element facing the low reflection region, and a light received by the light receiving element facing the high reflection region, according to a variation of the distance between the substrate and the pressure reception plate.

Preferably, the larger the pressure against the pressure reception plate is, the more a compression amount in the support portion becomes, and shorter the distance between a lower surface of the pressure reception plate and an upper surface of the substrate becomes.

Preferably, a light source emits a light to the plurality of light receiving elements, the light source being provided in a surface side where the plurality of light receiving elements are not formed on the substrate.

Preferably, the substrate comprises a member having a translucency, and wherein each of the light receiving element comprises:

a first electrode which is formed on the substrate, and which has a light blocking property;

a first insulation film which is formed on the first electrode and which is transparent;

a semiconductor film which is formed on the first insulation film in a state of facing the first electrode;

two impurity semiconductor films which are located separately from each other, both of which being attached to the semiconductor film;

a second electrode which is formed on one of the two impurity semiconductor films;

a third electrode which is formed on the other one of the two impurity semiconductor films;

a second insulation film which is transparent and which covers the semiconductor film, the impurity semiconductor films, the second electrode and the third electrode; and a fourth electrode which is formed on the second insulation film in a state of facing the semiconductor film.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

Hereinbelow, an embodiment of the present invention is described with reference to the attached drawings.

Figure 1:
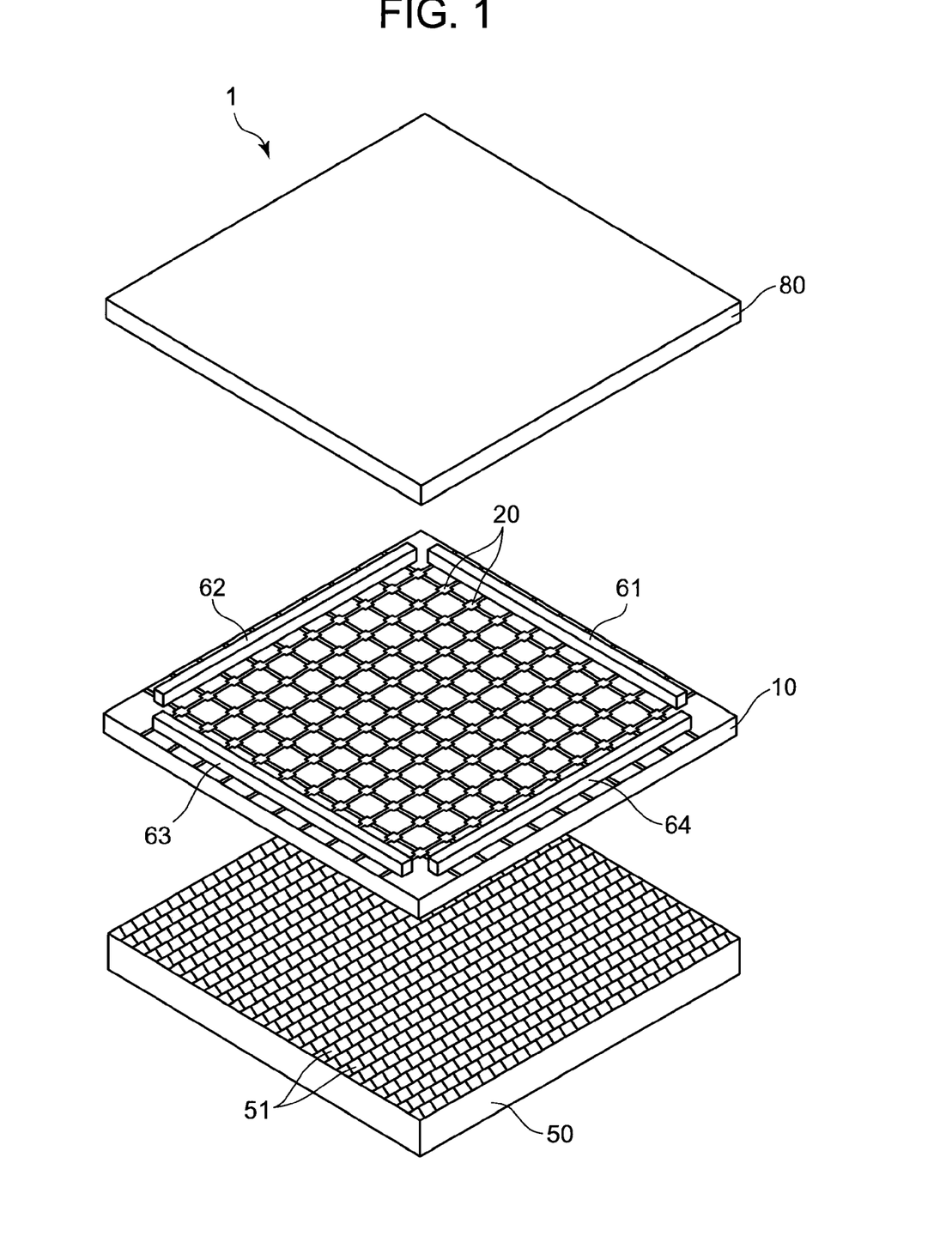
FIG. 1 is an exploded perspective diagram of an optical pressure sensor according to an embodiment of the present invention.
Figure 2A:
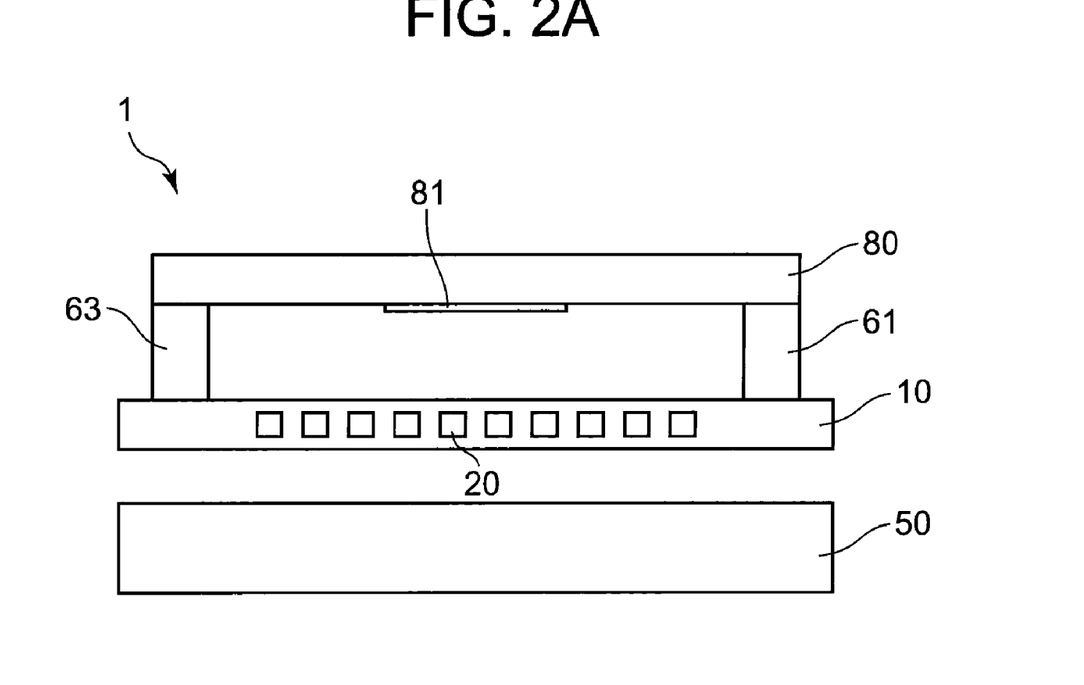
FIG. 2A is a schematic sectional diagram of the optical pressure sensor according to the embodiment.
Figure 2B:
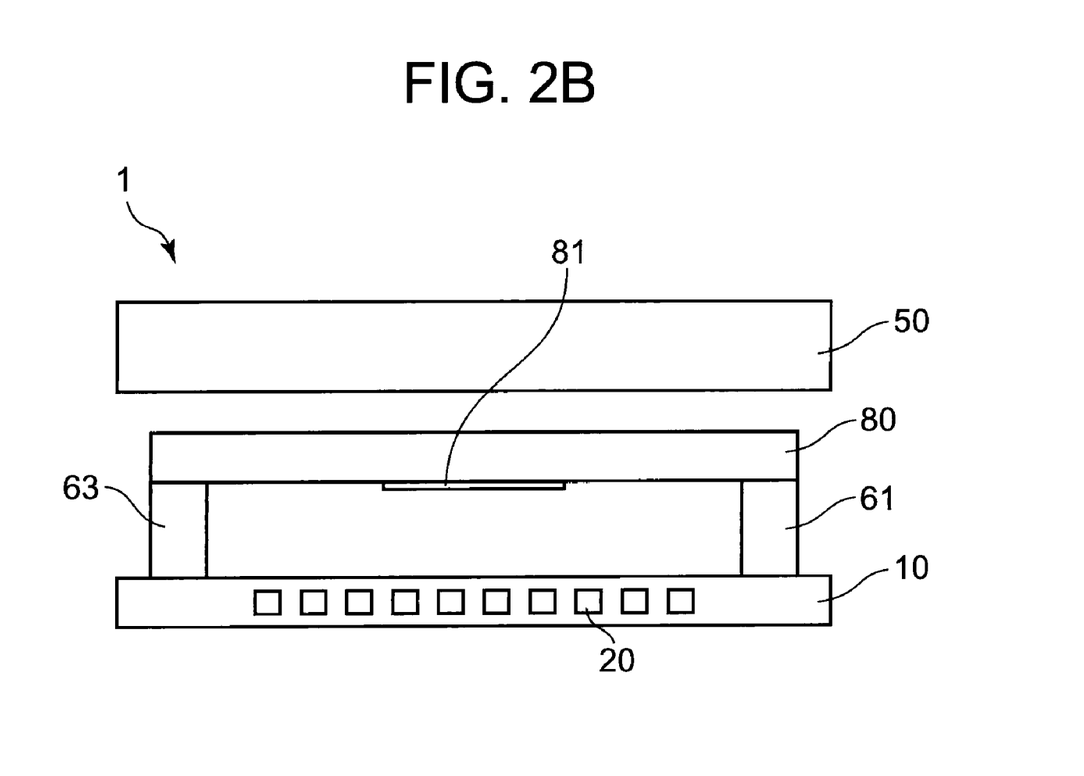
FIG. 2B is a schematic sectional diagram of an optical pressure sensor according to a modification example of the embodiment.

FIG. 1 is an exploded perspective diagram of an optical pressure sensor 1, and FIG. 2A is a sectional diagram of the optical pressure sensor 1. Further, FIG. 2B is a sectional diagram of an optical pressure sensor 101 of a modification example.

As shown in FIG. 1, the optical pressure sensor 1 comprises a light sensor 10; a light source 50; support portions (which are hereinbelow referred to as elastic support portions) 61-64; and a pressure reception plate 80.

Light Source

The light source 50 is faced to a lower surface of the light sensor 10. The light source 50 irradiates light to the light sensor 10 from a lower surface side of the light sensor 10. To put it concretely, the light source 50 is a surface-emitting device to perform a surface-emitting. That is to say, the light source 50 comprises a plurality of light emitting elements (for example, light emitting diodes (LEDs)) 51 which are arranged in a matrix. Incidentally, the light source 50 may be surface emitting elements such as an organic electroluminescence, an inorganic electroluminescence, and the like. Further, a surface-emitting apparatus (which for example may be used as a backlight of a liquid crystal display), comprising the light emitting elements and a light guide plate, may also be used as the light source 50.

Incidentally, as shown in FIG. 2B, the light source 50 may alternatively be faced to an upper surface of the light sensor 10, and the pressure reception plate 80 may be disposed in between the light source 50 and the light sensor 10. In the case shown in FIG. 2B, the light source 50 irradiates light to the light sensor 10 from an upper surface side of the light sensor 10. An optical pressure sensor 101 as shown in FIG. 2B is provided in the same manner as the optical pressure sensor 1 shown in FIG. 2A, besides the position of the light source 50, the translucency of the pressure reception plate 80, and a shaded region 84 which is formed in the lower surface of the pressure reception plate 80 being different.

Light Sensor

Figure 3:
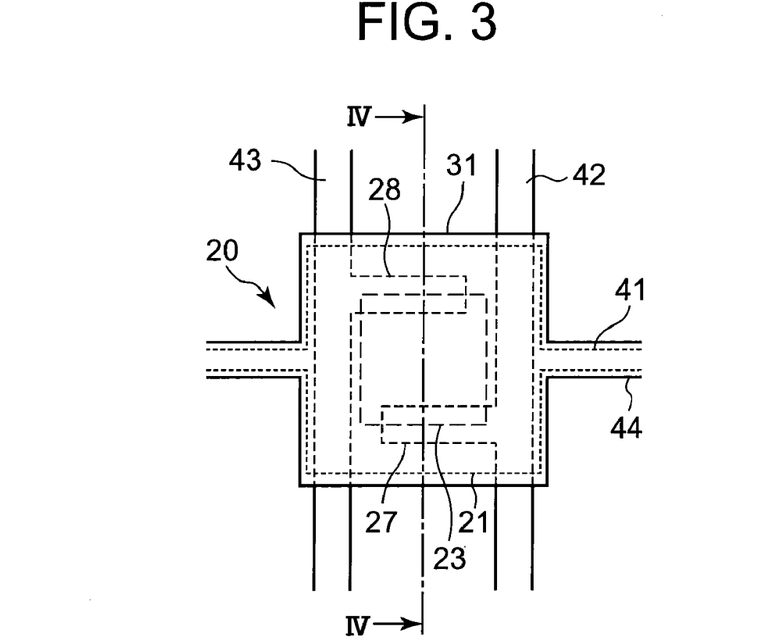
FIG. 3 is a plan diagram showing a pixel of a light sensor provided in the optical pressure sensor according to the embodiment.
Figure 4:
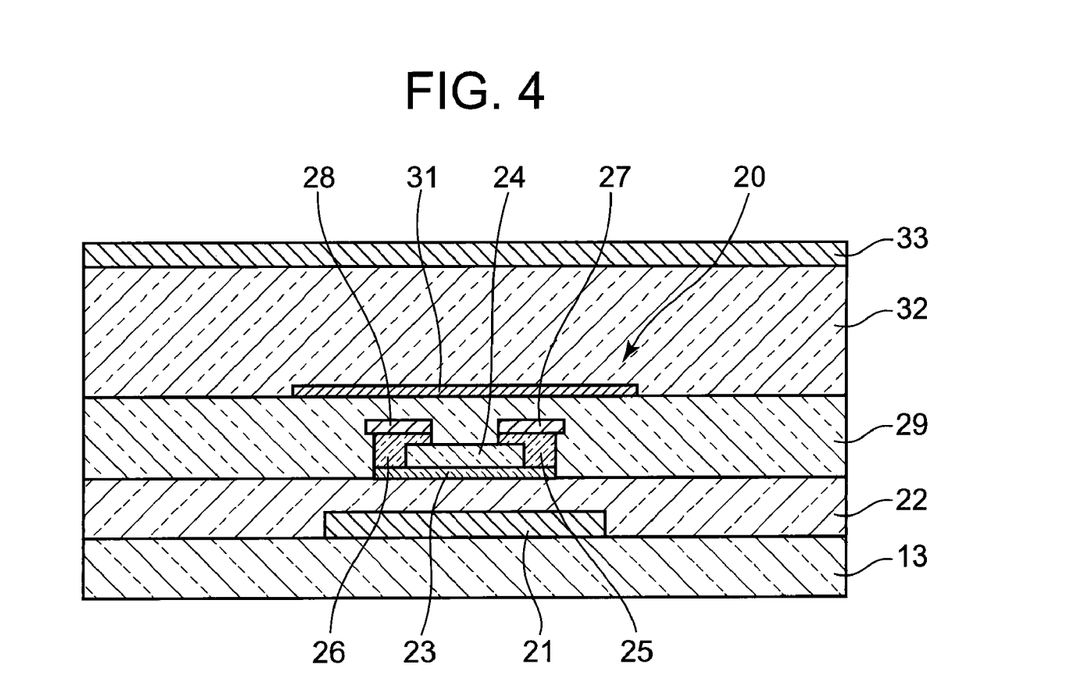
FIG. 4 is a sectional diagram as viewed from a IV-IV direction.

The light sensor 10 will be described with reference to FIGS. 1-4. FIG. 3 is a plan diagram showing 1 pixel of the light sensor 10. Further, FIG. 4 is a sectional diagram as viewed from a IV-IV direction of FIG. 3.

The light sensor 10 comprises a transparent substrate 13; a bottom gate insulation film 22; a top gate insulation film 29; a protection insulation film 32; and a front surface electrode 33, which are in a state of being laminated. The transparent substrate 13 may be a glass substrate (for example, a substrate made of a fused quartz), a plastic substrate (for example, a substrate made of a polycarbonate or polymethylmethacrylate (PMMA)), and other insulation substrates. The bottom gate insulation film 22, the top gate insulation film 29, and the protection insulation film 32 respectively have an insulation property and a translucency, and may respectively be made from for example, a silicon nitride film or a silicon oxide film. The front surface electrode 33 has a conductive property and a translucency, and may be made from for example, indium oxide, zinc oxide, tin oxide, or a mixture which includes at least one of the aforementioned substances (such as indium tin doped oxide (ITO), and indium zinc doped oxide).

In the light sensor 10, a double gate transistor is used for a light receiving element (photoelectric conversion element) 20, and 1 pixel comprises 1 light receiving element 20. A plurality of the light receiving elements 20, 20, . . . , are arranged in a two dimensional array, and more specifically, in a matrix. These light receiving elements 20, 20, . . . , are integrally covered by the protection insulation film 32. Incidentally, the light sensor 10 is not limited to what is described above, as long as the light sensor 10 is provided in a low reflection region 81 provided in the pressure reception plate 80, and in a position which faces a high reflection region.

Further, in the light sensor 10, a plurality of bottom gate lines 41, 41, ..., a plurality of source lines 42, 42, ..., a plurality of drain lines 43, 43, ..., and a plurality of top gate lines 44, 44, ..., are respectively formed so as to specify an address of the light receiving element 20. The bottom gate lines 41, 41, ... extend in a lateral direction in a state where each of the bottom gate lines is parallel to each other, and are formed in between the transparent substrate 13 and the bottom gate insulation film 22. The source lines 42, 42, ... and the drain lines 43, 43, ... respectively extend in a longitudinal direction in a state where each of the lines is parallel to each other, and are formed in between the bottom gate insulation film 22 and the top gate insulation film 29. The source line 42 and the drain line 43 are arranged one after the other. The top gate lines 44, 44, ... extend in a lateral direction in a state where each of the top gate lines is parallel to each other, and are formed in between the top gate insulation film 29 and the protection insulation film 32. Incidentally, in FIGS. 2A and 2B, the bottom gate lines 41 are hidden by the top gate lines 44.

The light receiving element 20 comprises a bottom gate electrode 21; a semiconductor film 23; a channel protection film 24; an impurity semiconductor film 25; an impurity semiconductor film 26; a source electrode 27; a drain electrode 28; a top gate electrode 31, and the like.

The bottom gate electrode 21 is formed in between the transparent substrate 13 and the bottom gate insulation film 22. The semiconductor film 23, the channel protection film 24, the impurity semiconductor film 25, the impurity semiconductor film 26, the source electrode 27, and the drain electrode 28 are respectively formed in between the bottom gate insulation film 22 and the top gate insulation film 29. The top gate electrode 31 is formed in between the top gate insulation film 29 and the protection insulation film 32.

The bottom gate electrode 21 is formed on the transparent substrate 13 for each light receiving element 20. The bottom gate electrode 21 of the light receiving elements 20, 20, ..., arranged in the same line in the lateral direction is formed integrally with the common bottom gate line 41. The bottom gate electrode 21 and the bottom gate lines 41 respectively have a conductive property and a light blocking property, and may be made from for example, chrome, chrome alloy, aluminum, aluminum alloy, or an alloy of these substances.

The semiconductor film 23 is formed on the bottom gate insulation film 22 in a state of facing the bottom gate electrode 21. The semiconductor film 23 is independently formed for each light receiving element 20. The semiconductor film 23 comprises amorphous silicon. The semiconductor film 23 is to be the channel layer.

The channel protection film 24 is formed on the center portion of the semiconductor film 23. The channel protection film 24 is made by being independently performed with a patterning for each light receiving element 20. The channel protection film 24 has an insulation property and a translucency, and may be made from silicon nitride or silicon oxide. The channel protection film 24 is to protect the semiconductor film 23 from an etchant which is used for the patterning. When a light enters the semiconductor film 23, electron-hole pairs having an amount according to the amount of the entered light are generated mainly in the vicinity of an interfacial surface between the channel protection film 24 and the semiconductor film 23.

The impurity semiconductor films 25, 26 are performed with the patterning independently for each light receiving element 20. The impurity semiconductor film 25 is formed so as to overlap a portion of the semiconductor film 23. Further, a portion of the impurity semiconductor film 25 overlaps the channel protection film 24. The impurity semiconductor film 26 is formed so as to overlap another portion of the semiconductor film 23. Further, a portion of the impurity semiconductor film 26 overlaps the channel protection film 24. The impurity semiconductor films 25, 26 are separated from each other. Further, the impurity semiconductor films 25, 26 are made from amorphous silicon including n-type impurity ($n^+$ silicon).

The source electrode 27 overlaps the impurity semiconductor film 25. The drain electrode 28 overlaps the impurity semiconductor film 26. The source electrode 27 and the drain electrode 28 are respectively formed for each light receiving element 20. The source electrode 27 of the light receiving elements 20, 20, ..., arranged in the same column in the longitudinal direction is formed integrally with the common source line 42, and the drain electrode 28 of the light receiving elements 20, 20, ..., arranged in the same column in the longitudinal direction is formed integrally with the common drain line 43. The source electrode 27, the drain electrode 28, the source lines 42, and the drain lines 43 respectively have a conductive property and a light blocking property, and may be made from for example, chrome, chrome alloy, aluminum, aluminum alloy, or an alloy of these substances.

The top gate electrode 31 is formed on the top gate insulation film 29 in a state of facing the semiconductor film 23. The top gate electrode 31 is formed on the top gate insulation film 29 for each light receiving element 20. The top gate electrode 31 of the light receiving elements 20, 20, ..., arranged in the same line in the lateral direction is formed integrally with the common top gate line 44. The top gate electrode 31 and the top gate lines 44 respectively have a conductive property and a translucency, and may be made from for example, indium oxide, zinc oxide, tin oxide, or a mixture which includes at least one of the aforementioned substances (such as indium tin doped oxide (ITO), and indium zinc doped oxide).

The protection insulation film 32 is formed on the top gate electrode 31, and the front surface electrode 33 is formed on the protection insulation film 32. The front surface electrode 33 is grounded so that an electric charge is discharged by the front surface electrode 33, thereby an electrostatic destruction is to be prevented.

The light sensor 10 which is configured as described above is of a translucent type in which the light can be transmitted in between the light receiving elements 20. That is to say, because the transparent substrate 13, the bottom gate insulation film 22, the top gate insulation film 29, the protection insulation film 32, and the front surface electrode 33 are respectively transparent, even when the light emitted from the light source 50 which is placed in the lower surface side of the light sensor 10 enters the transparent substrate 13, the light is transmitted through the transparent substrate 13, the bottom gate insulation film 22, the top gate insulation film 29, the protection insulation film 32, and the front surface electrode 33, thereby the transmitted light exits toward above from the surface of the front surface electrode 33. Here, the light which is emitted from the light source 50 to enter the transparent substrate 13 is blocked by the bottom gate electrode 21, thus the light does not enter directly to the semiconductor film 23 from the lower portion of the semiconductor film 23. On the other hand, the front surface electrode 33, the protection insulation film 32, the top gate electrode 31, the top gate insulation film 29, and the channel protection film 24 are respectively transparent, thereby the light which enters the front surface electrode 33 from above the light sensor 10 enters the semiconductor film 23.

The light sensor 10 is of the translucent type, thus even when the pressure reception plate 80 is disposed so as to face the light sensor 10, the lower surface of the pressure reception plate 80 is irradiated by the light from the light source 50.

Elastic Support Portion

As shown in FIG. 1, the elastic support portions 61-64 are attached onto the peripheral part of an upper surface of the light sensor 10 (which is the surface of the front surface electrode 33). These elastic support portions 61-64 are disposed in a state of a rectangular frame, thereby the light sensor 10 is surrounded by these elastic support portions 61-64. Further, a plurality of the light receiving elements 20, 20, . . . are disposed in an inner side of these elastic support portions 61-64. The elastic support portions 61-64 are made of rubber, a spring, or the like.

Incidentally, the elastic support portions 61-64 do not necessarily have to be provided on the upper surface of the light sensor 10. The elastic support portions 61-64 may, for example, alternatively be provided in a state where the light sensor 10 is mounted on the light source 50, and the elastic support portions 61-64 which are thicker than the light sensor 10 may be provided on the light source 50 so as to surround the light sensor 10.

Pressure Reception Plate

The pressure reception plate 80 is attached onto the elastic support portions 61-64 in a state of facing the upper surface of the light sensor 10. The pressure reception plate 80 is supported by the elastic support portions 61-64, thereby the lower surface of the pressure reception plate 80 and the upper surface of the light sensor 10 are separated from each other. The pressure reception plate 80 is a rigid body made from a metal or the like, so that the elastic modulus of the pressure reception plate 80 is well larger than that of the elastic support portions 61-64. Accordingly, when a pressure is applied to the upper surface of the pressure reception plate 80 toward below, the pressure reception plate 80 is hardly bent, the elastic support portions 61-64 are compressed, and a distance between the transparent substrate 13 and the pressure reception plate 80 varies.

Figure 5A:
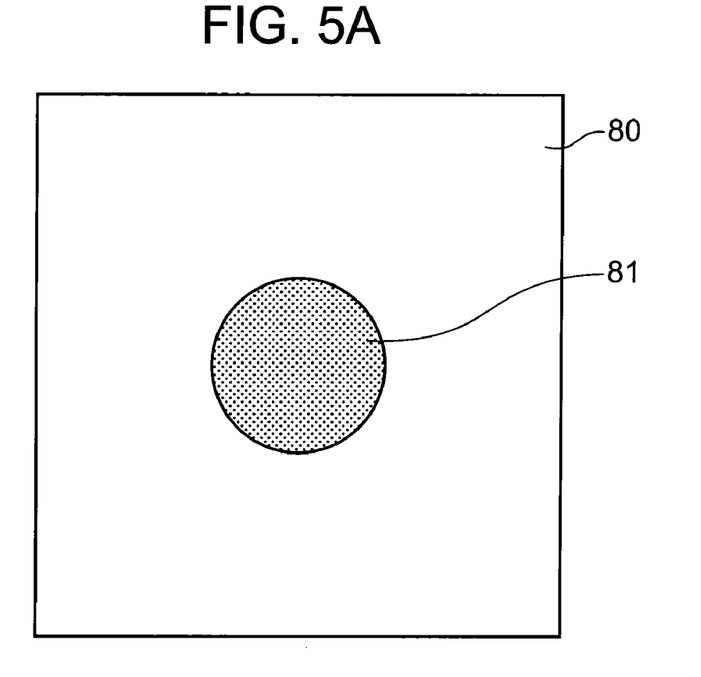
FIG. 5A is a diagram of a lower surface of a pressure reception plate provided in the optical pressure sensor according to the embodiment.
Figure 5B:
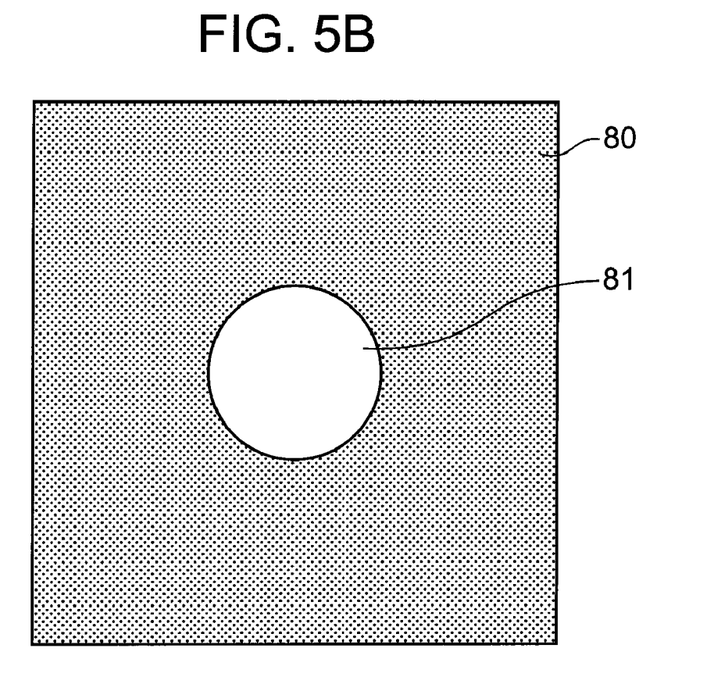
FIG. 5B is a diagram of a lower surface of a pressure reception plate according to the modification example.

FIGS. 5A and 5B are a diagram of the lower surface of the pressure reception plate 80. As shown in FIG. 5A, the low reflection region 81 is formed by a low reflection member in a state of a thin film, in the center portion of the lower surface of the pressure reception plate 80. The low reflection region 81 is provided in a circular shape. The reflection ratio of the low reflection region 81 is relatively low compared to that of the surroundings of the low reflection region 81 (which is the lower surface of the pressure reception plate 80). For example, the pressure reception plate 80 may be made from a white member having high reflection, and the low reflection region 81 may be made from a black member having low reflection. Incidentally, as shown in FIG. 5B, the pressure reception plate 80 may alternatively be made from a low reflection member, and a high reflection region 83 which is made from a high reflection member having a relatively higher reflection ratio compared to the pressure reception plate 80, may be provided instead of the low reflection region 81. Further, a low reflection portion made from a low reflection member and a high reflection portion made from a high reflection member may be separately provided in the lower surface of the pressure reception plate 80. That is to say, a binary image pattern including the low reflection region and the high reflection region may be formed on the lower surface of the pressure reception plate 80.

As shown in FIG. 2A, in a case where the light source 50 faces the lower surface of the light sensor 10, the binary image pattern including the low reflection region and the high reflection region is formed on the lower surface of the pressure reception plate 80 as shown in FIGS. 5A and 5B. On the other hand, as shown in FIG. 2B, in a case where the light source 50 faces the upper surface of the light sensor 10, the pressure reception plate 80 is a transparent plate, and the shaded region 84 which is in a state of a thin film is formed in the center portion of the lower surface of the pressure reception plate 80. The shaded region 84 is formed in a circular shape. The pressure reception plate 80 has a translucency, thus the pressure reception plate 80 is made from a material which has a high light transmission ratio, and a low reflection ratio. Further, the shaded region 84 has a light blocking property, thus the light transmission ratio of the shaded region 84 is sufficiently smaller than that of the pressure reception plate 80, and the reflection ratio of the shaded region 84 is larger than that of the pressure reception plate 80.

Pressure Measurement Principle of the Optical Pressure Sensor

As described above, the light emitted from the light source 50 which is placed in the lower surface side of the optical sensor 10 passes through the light sensor 10, and is reflected by the lower surface of the pressure reception plate 80, so as that the reflected light enters the semiconductor film 23 of the light receiving elements 20. On this occasion, when the light sensor 10 is driven, the amount of the light received by the semiconductor film 23 of the light receiving elements 20 is converted into electric signals. Thereby, an image is obtained by the light sensor 10. The image obtained by the light sensor 10 is an image including the high reflection region and the low reflection region 81 formed on the lower surface of the pressure reception plate 80. Incidentally, a driving circuit and a driving method of the light sensor 10 will be described later.

Figure 6:
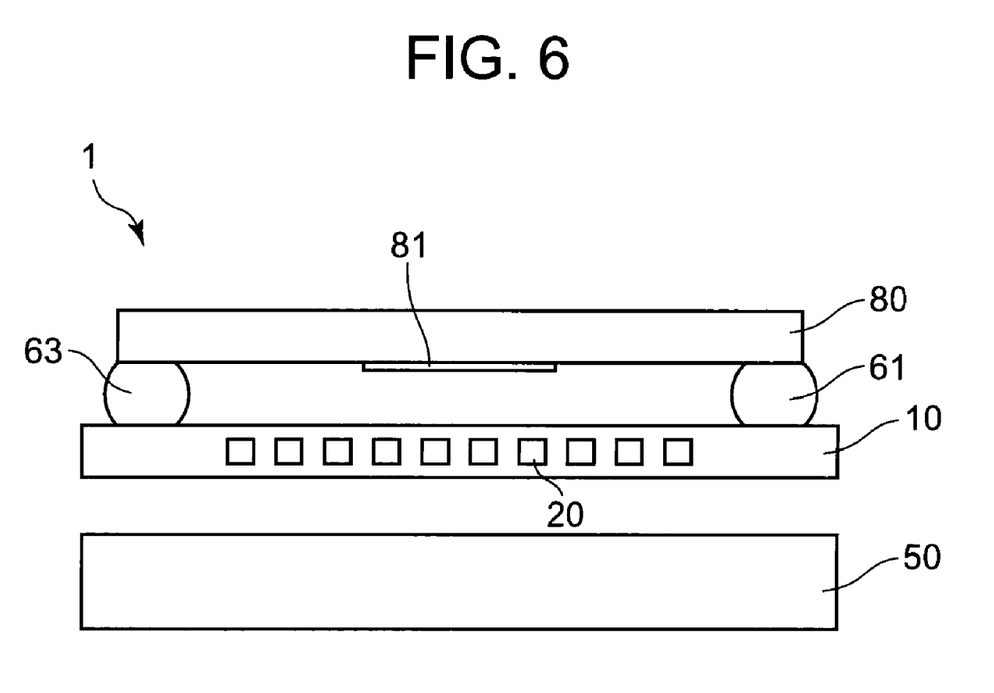
FIG. 6 is a schematic sectional diagram of the optical pressure sensor according to the embodiment.

On the other hand, as shown in FIG. 6, when a pressure is applied to the upper surface of the pressure reception plate 80 toward below, the elastic support portions 61-64 are compressed. The larger the pressure against the pressure reception plate 80 is, the more the compression amount of the elastic support portions 61-64 are, and the shorter the distance between the lower surface of the pressure reception plate 80 and the upper surface of the light sensor 10 becomes.

Figure 7:
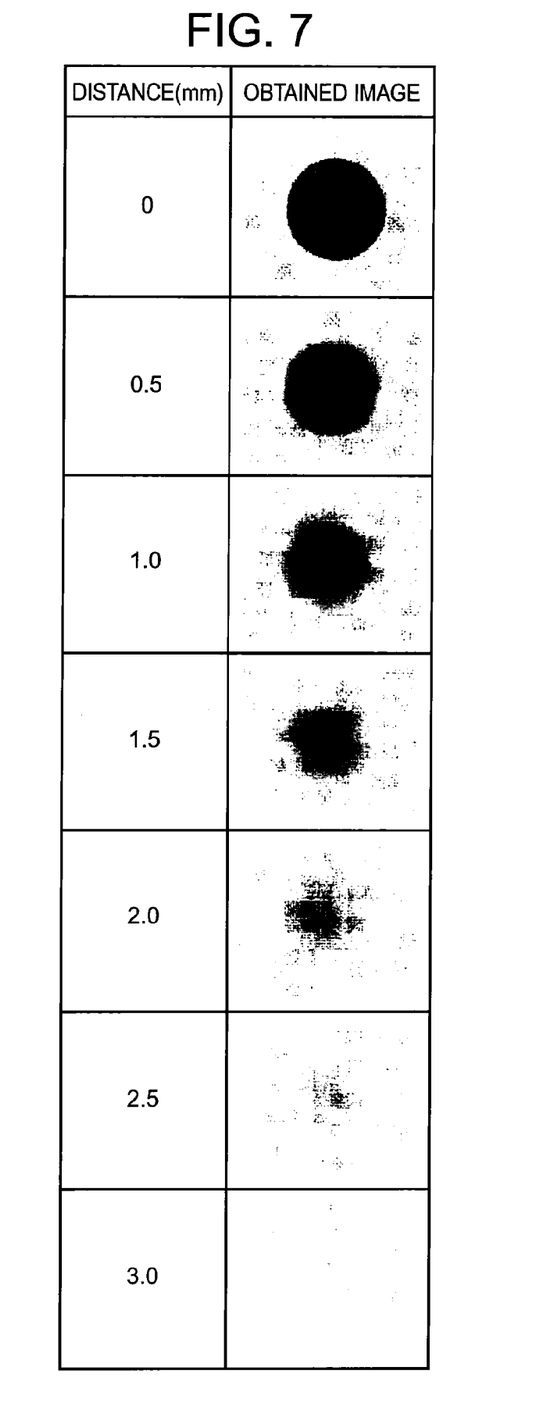
FIG. 7 is a diagram showing a relationship between a distance from the pressure reception plate to the light sensor, and an image obtained by the light sensor.

FIG. 7 is a diagram showing the relationship between the distance from the lower surface of the pressure reception plate 80 to the light sensor 10, and the image obtained by the light sensor 10. As is clear from FIG. 7, the longer the distance between the lower surface of the pressure reception plate 80 and the upper surface of the light sensor 10 is, the more obvious the blurring of the obtained image becomes. That is to say, the greater the pressure against the pressure reception plate 80 is, the more obvious the blurring of the obtained image becomes, and the smaller the pressure against the pressure reception plate 80 is, the sharper the obtained image becomes. Accordingly, the pressure against the pressure reception plate 80 is determined by the degree of the blurring in the obtained image, thus the pressure against the pressure reception plate 80 can be quantified by quantifying the degree of the blurring in the obtained image.

Figure 8:
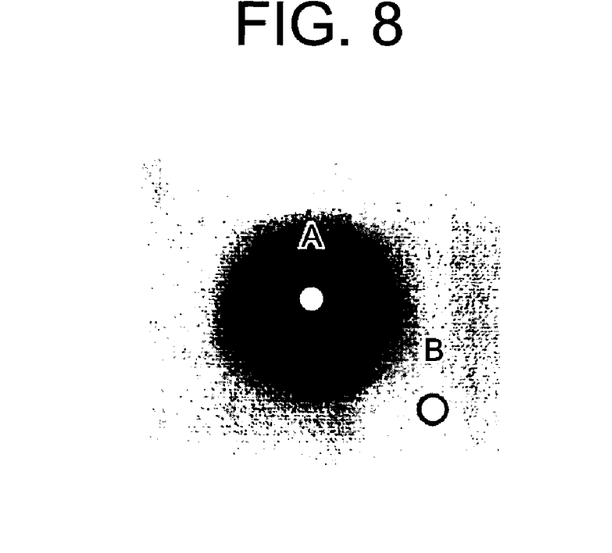
FIG. 8 is a diagram showing the image obtained by the light sensor according to the embodiment.
Figure 9:
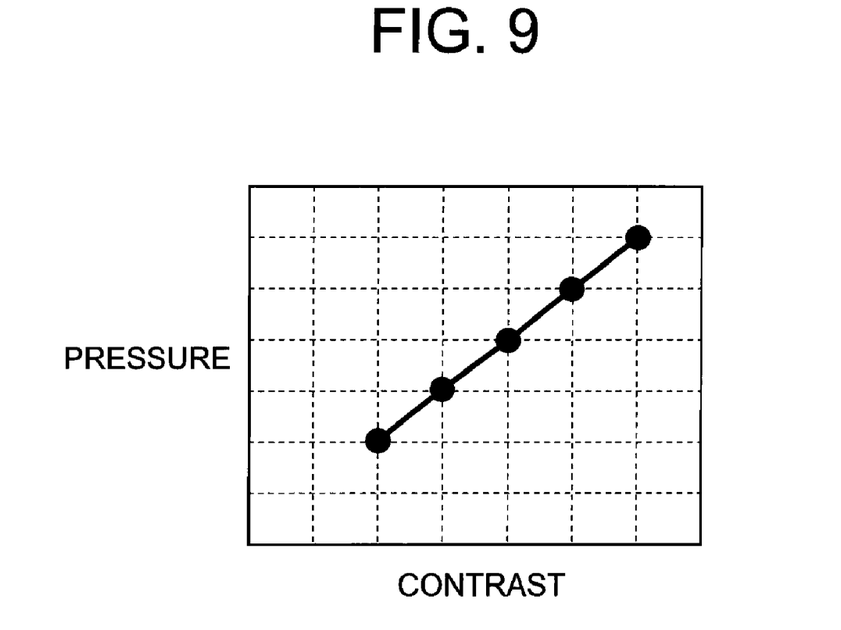
FIG. 9 is a graph showing a relationship between a contrast and a pressure according to the embodiment.

Thus, in order to quantify the blurring degree in the obtained image, the contrast of the obtained image is obtained. That is to say, as shown in FIG. 8, a ratio contrast between the brightness of a dark point A in the obtained image (which dark point A may for example be the darkest pixel in the obtained image, the center pixel therein, or the like), and a bright point B in the obtained image (which bright point B may for example be the brightest pixel in the obtained image, a predetermined pixel away from the center pixel therein, or the like), is obtained, thereby the pressure can be obtained from the contrast. For example, the contrast may be defined by (the received light amount in the bright point B/the received light amount in the dark point A), and a correlation graph (see for example FIG. 9), a correlation formula, or a correlation table which shows a relationship between the contrast and the pressure is prepared in advance, thereby the pressure can be obtained from the contrast by using the correlation graph, the correlation formula, or the correlation table.

Incidentally, the case where the light source 50 is provided in the lower surface side of the light sensor 10 is described here, however, the light source 50 may alternatively be provided in the upper surface side of the light sensor 10, as shown in FIG. 2B. In such a case, among the image obtained by the light sensor 10, a portion which corresponds to the pressure reception plate 80 is to be bright, and a portion which corresponds to the shaded region 84 is to be dark. Also in this case, the greater the pressure against the pressure reception plate 80 is, the more obvious the blurring of the obtained image becomes, and the smaller the pressure against the pressure reception plate 80 is, the sharper the obtained image becomes. Accordingly, the pressure against the pressure reception plate 80 is determined by the degree of the blurring in the obtained image, thus the pressure against the pressure reception plate 80 can be quantified by quantifying the degree of the blurring in the obtained image, in the same manner as described above.

Driving Circuit and Driving Method of the Light Sensor

Figure 10:
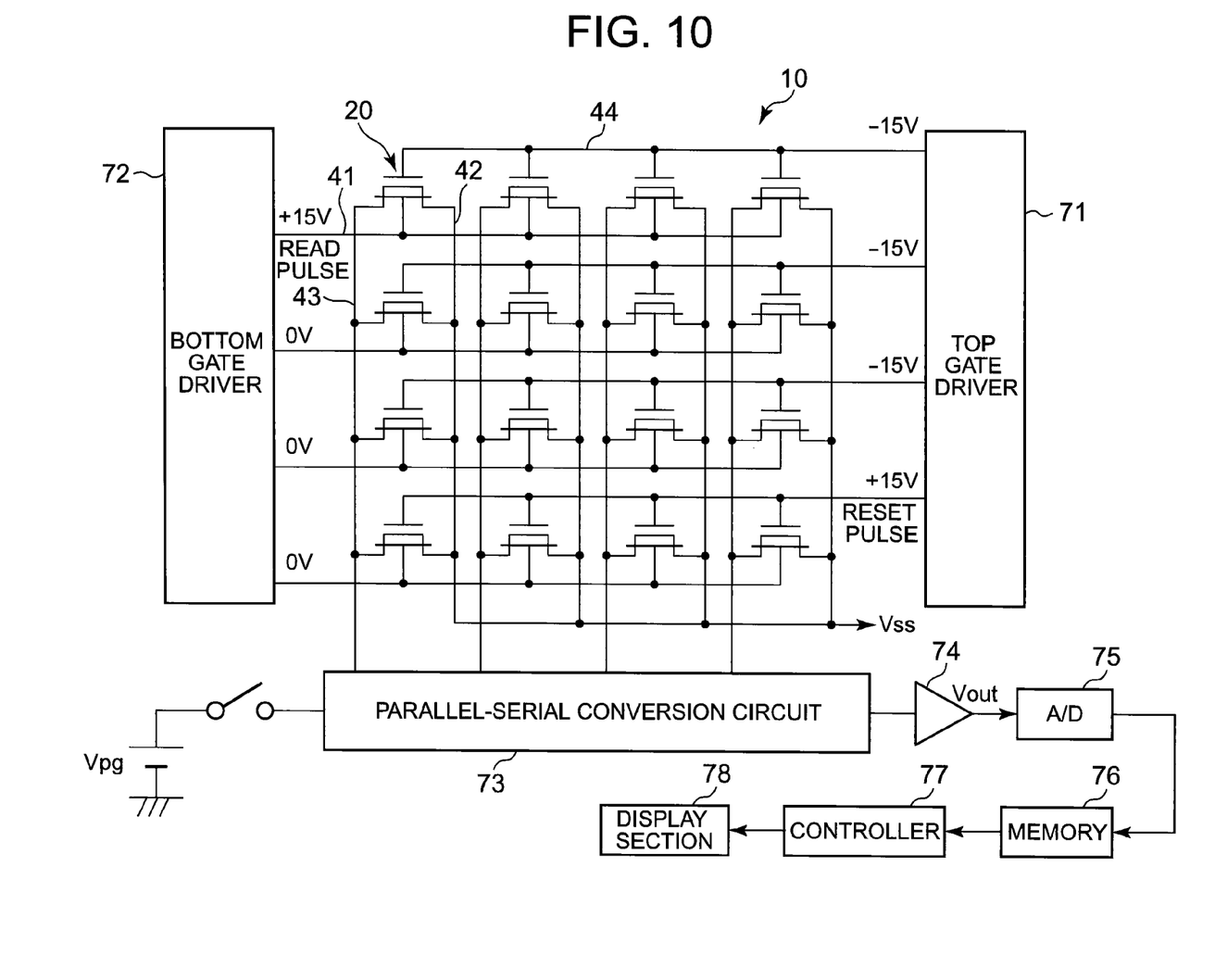
FIG. 10 is a diagram showing a schematic configuration of a pressure measurement apparatus using the optical pressure sensor according to the embodiment.

FIG. 10 is a diagram showing a schematic configuration of a pressure measurement apparatus using the optical pressure sensor 1. FIG. 10 shows not only the optical sensor 10 and the driving circuit thereof, but also a controller 77 to obtain the pressure by quantifying the blurring degree of an image obtained by the optical sensor 1, and the like.

The top gate lines 44, 44, . . . of the optical sensor 10 are connected to a terminal of a top gate driver 71, the bottom gate lines 41, 41, . . . are connected to a terminal of a bottom gate driver 72, and the drain lines 43, 43, . . . are connected to a terminal of a parallel-serial conversion circuit 73. Further, the source lines 42, 42, . . . of the optical sensor 10 are connected to a fix voltage source (Vss), and in this example, the source lines 42, 42, . . . are grounded. The top gate driver 71 is a first scanning driver to select the top gate lines 44, 44, . . . in an order from the first line. The bottom gate driver 72 is a second scanning driver to select the bottom gate lines 41, 41, . . . in an order from the first line.

Figure 11:
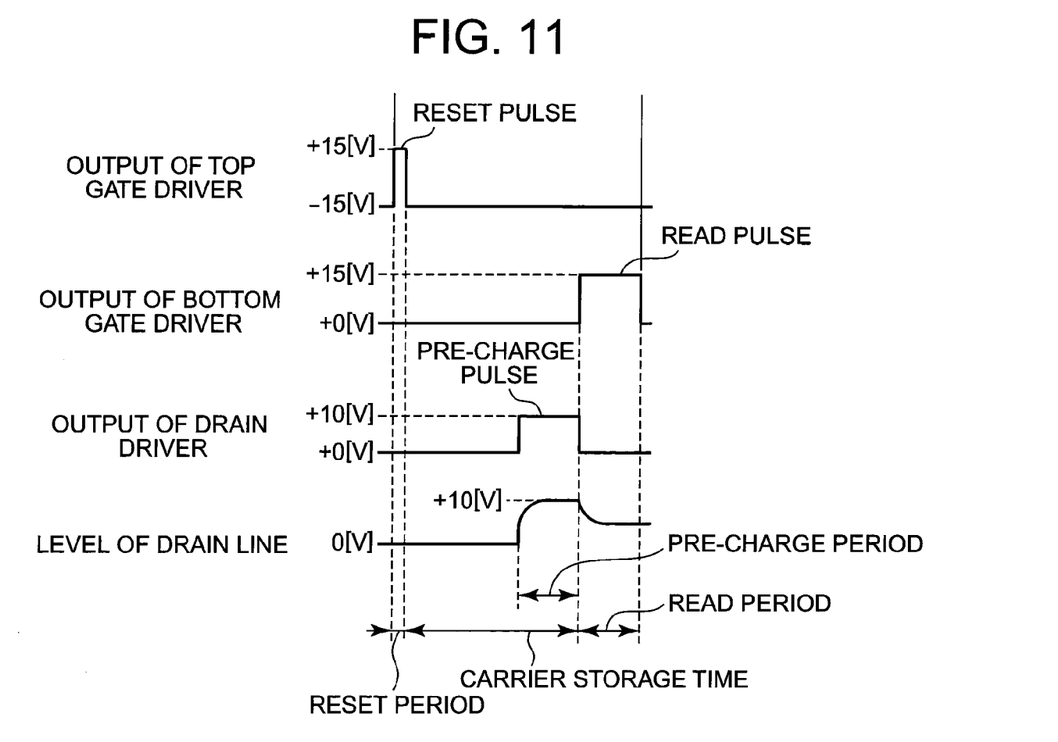
FIG. 11 is a timing chart showing a process of a signal to drive the light sensor according to the embodiment.

FIG. 11 is a timing chart showing the process of a signal to drive the light sensor 10.

The top gate driver 71 sequentially outputs a reset pulse to the top gate lines 44, 44, . . . . The level of the reset pulse is in a high level of +15 [V], and the level at the time when the reset pulse is not output is in a low level of −15[V]. A shift register may be used as the top gate driver 71. A period during which the reset pulse is output is referred to as a reset period.

The bottom gate driver 72 sequentially outputs a read pulse to the bottom gate lines 41, 41, . . . . The level of the read pulse is in a high level of +15 [V], and the level at the time when the read pulse is not output is in a low level of ±0 [V]. A shift register may be used as the bottom gate driver 72. A period during which the read pulse is output is referred to as a read period.

A horizontal scanning cycle of the top gate driver 71 (which is a period from an output of the reset pulse for a given line to another output of the reset pulse for the next line) is equal to a horizontal scanning cycle of the bottom gate driver 72 (which is a period from an output of the read pulse for a given line to another output of the read pulse for the next line). Further, a phase of the scanning performed by the bottom gate driver 72 is delayed with respect to a phase of the scanning performed by the top gate driver 71. That is to say, the timing at which the read pulse is output is delayed compared to the timing at which the reset pulse is output, in each line. This delay is to be a carrier storage time.

To put it concretely, the top gate driver 71 and the bottom gate driver 72 respectively shift output signals so that the top gate driver 71 outputs the reset pulse to any one of the lines of the top gate lines 44, and after the carrier storage time, the bottom gate driver 72 outputs the read pulse to the bottom gate line 41 placed on the same line.

The parallel-serial conversion circuit 73 reads the output value (the voltage) of the light receiving elements 20, 20, . . . placed in the lines selected by the bottom gate driver 72, so as to sequentially output the output value of the read light receiving elements 20, 20, . . . . To put it concretely, the parallel-serial conversion circuit 73 outputs a pre-charge pulse in parallel to the entire drain lines 43, 43, . . . during a period from the output of the reset pulse to the output of the read pulse. The level of the pre-charge pulse is in a high level of +10 [V], and the level at the time when the pre-charge pulse is not output is in a low level of ±0 [V]. A period during which the pre-charge pulse is output is referred to as a pre-charge period.

Further, the parallel-serial conversion circuit 73 inputs in parallel the output value (the voltage) of the light receiving elements 20, 20, . . . placed in the lines selected by the bottom gate driver 72, after the output of the pre-charge pulse and when the read pulse is being output. Subsequently, the parallel-serial conversion circuit 73 sequentially outputs in serial the output values which have been input in parallel. Thereby, the image input is performed by the light sensor 10.

The operation of each light receiving element 20 placed in any one of the lines (hereinafter, referred to as $i^{th}$ line) selected by the top gate driver 71 and the bottom gate driver 72, will be described in detail.

When the top gate driver 71 outputs the reset pulse to the top gate line 44 placed in the $i^{th}$ line, the top gate line 44 placed in the $i^{th}$ line will be in the high level. The carrier which is stored in the vicinity of the interfacial surface between the internal semiconductor film 23 or the semiconductor film 23 and the channel protection film 24 (here, the hole) is repelled and discharged by the voltage of the top gate electrode 31, for each light receiving element 20 in the $i^{th}$ line, while the reset period in which the top gate line 44 in the $i^{th}$ line is in a high level.

Subsequently, the top gate driver 71 outputs the reset pulse to the top gate line 44 in the $i^{th}$ line, and then applies a negative potential (−15[V]) to the top gate line 44 in the $i^{th}$ line so as to electrically supplement the holes among the electron-hole pairs generated in the semiconductor film 23 by the light entering into the semiconductor film 23. When the negative potential is applied to the top gate electrode 31 of each light receiving element 20 in the $i^{th}$ line, the holes among the electron-hole pairs generated in the semiconductor film 23 according to the amount of the light entered in the semiconductor film 23, is stored in the vicinity of the interfacial surface between the internal semiconductor film 23 or the semiconductor film 23 and the channel protection film 24 by the electrical field.

During the carrier storage time, the parallel-serial conversion circuit 73 outputs the pre-charge pulse to the entire drain lines 43, 43, . . . . During the pre-charge period in which the pre-charge pulse is being output, the potential applied to the top gate electrode 31 is a negative potential (−15[V]), in each light receiving element 20 in the $i^{th}$ line. Accordingly, the electrical field by the holes stored in the vicinity of the interfacial surface between the internal semiconductor film 23 or the semiconductor film 23 and the channel protection film 24 by the negative electrical field inevitably cancels out the negative electrical field, and thus the electrical field cannot be a positive electrical field having a degree being capable of forming an n channel in the channel region in the semiconductor film 23. Thus, since the potential applied to the bottom gate electrode 21 is ±0 [V], the channel will not be formed in the semiconductor film 23 even when a potential difference of the pre-charge pulse between the drain electrode 28 and the source electrode 27 is generated, thereby a current does not flow in between the drain electrode 28 and the source electrode 27. During the pre-charge period, the current does not flow in between the drain electrode 28 and the source electrode 27, and thereby the drain electrode 28 of each light receiving element 20 in the $i^{th}$ line is charged by the pre-charge pulse which is output to the drain lines 43, 43, . . . .

When the parallel-serial conversion circuit 73 finishes the output of the pre-charge pulse, the bottom gate driver 72 outputs the read pulse to the bottom gate line 41 in the $i^{th}$ line. During the read period in which the bottom gate driver 72 outputs the read pulse to the bottom gate line 41 in the $i^{th}$ line, the potential of a high level is applied to the bottom gate electrode 21 of each light receiving element 20 in the $i^{th}$ line, thereby each light receiving element 20 in the $i^{th}$ line is in an on state.

During the read period, the carrier which has been stored in the carrier storage time acts to ease the negative electrical field of the top gate electrode 31. Accordingly, when the amount of the entered light is sufficient, and the amount of the carrier is also sufficient, the n channel is formed in the semiconductor film 23 with the positive electrical field in the bottom gate electrode 21. Thus, the current flows from the drain electrode 28 to the source electrode 27, and the charge of the drain electrode 28 decreases. Accordingly, in the read period, the voltage of the drain lines 43, 43, . . . shows an indication of being decreased gradually as time passes by the current between the drain-source.

In the carrier storage time, as the amount of the light which entered in the semiconductor film 23 increases, the carrier to be stored increases. As the stored carrier increases, the charge decreasing rate of the drain electrode 28 in the read period increases, and the current level which flows from the drain electrode 28 to the source electrode 27 in the read period increases. Accordingly, the decreasing tendency of the voltage of the drain lines 43, 43, . . . in the read period is deeply relevant to the amount of the light which has entered in the semiconductor film 23 in the carrier storage time.

Further, during a period from the read period in the $i^{th}$ line to the pre-charge period in the next $(i+1)^{th}$ line, the voltage (the output value) of the drain lines 43, 43, . . . from the start of the read period until after a predetermined time is detected by the parallel-serial conversion circuit 73. The parallel-serial conversion circuit 73 outputs the voltage (the output value) of the drain lines 43, 43, . . . for each column sequentially as Vout.

Further, the output value (the voltage) which is sequentially output from the parallel-serial conversion circuit 73 is amplified by an amplifier 74, quantized by an A/D (analog/digital) converter 75, so as to be recorded in a memory 76.

Function of the Controller

Figure 12:
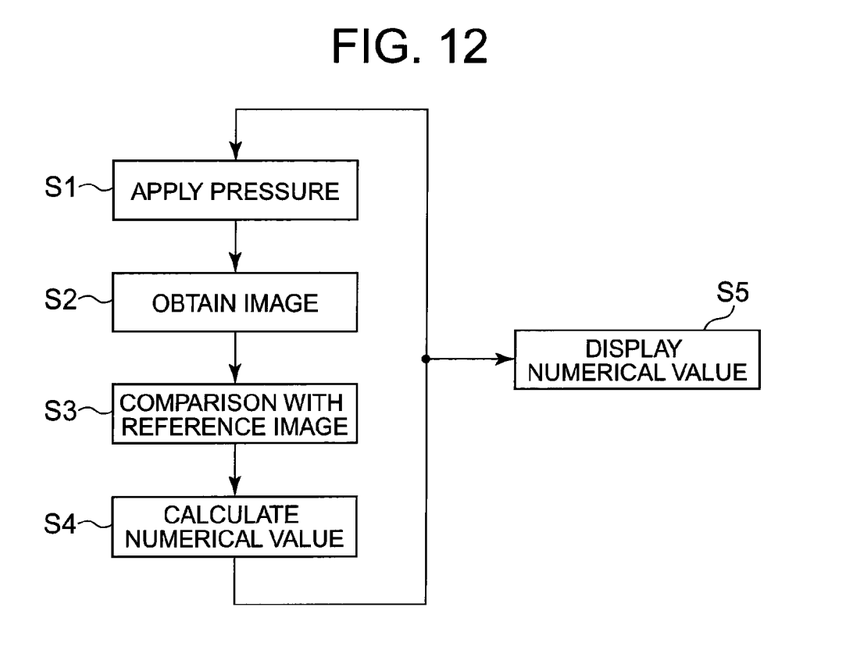
FIG. 12 is a calculation flow to quantify the pressure according to the embodiment.

FIG. 12 shows the calculation flow to quantify the pressure by a controller 77.

As shown in FIG. 12, when the pressure reception plate 80 is pressurized (step S1), and the light sensor 10 is driven by the top gate driver 71, the bottom gate driver 72, and the parallel-serial conversion circuit 73, the amount of the light received in each light receiving element 20 is measured, so that the received light amount is recorded in the memory 76 (step S2). The controller 77 compares the obtained received light amount and a reference received light amount (step S3), and quantifies the pressure into numbers (step S4), so as to display the quantified pressure in a display section 78 (step S5).

A further detail will be given.

The controller 77 comprises a central processing unit (CPU) and a read only memory (ROM). In the ROM of the controller 77, the correlation (for example, the correlation graph shown in FIG. 9) which describes the relationship between the contrast and the pressure is previously recorded. Further, the controller 77 performs the following processing by the CPU.

That is to say, the controller 77 detects the dark point A and the bright point B from the received light amount which is recorded in the memory 76, so as to obtain the contrast from the ratio of the brightness (the received light amount) of the dark point A and the bright point B. Thus, (the received light amount of the bright point B/the received light amount of the dark point A) is obtained as the contrast. This processing corresponds to step S3 shown in FIG. 12. Incidentally, the controller 77 detects the received light amount of the center pixel or the received light amount of the darkest pixel as the received light amount of the dark point A, among the values of the received light amount in each light receiving element 20 recorded in the memory 76, and also detects the received light amount of the predetermined pixel away from the center pixel or the received light amount of the brightest pixel as the received light amount of the dark point B.

Further, the controller 77 refers to the correlation recorded in the ROM, so as to obtain the pressure corresponding to the obtained contrast. This processing corresponds to step S4 shown in FIG. 12.

Further, the controller 77 displays the obtained pressure in the display section 78. This processing corresponds to step S5 shown in FIG. 12.

In the present embodiment, the ratio of the received light amount of the dark point A and the received light amount of the bright point B is used when the contrast is obtained, however the pressure can uniquely be quantified by alternatively using a difference value of the received light amount of the dark point A and the received light amount of the bright point B.

The entire disclosure of Japanese Patent Application No. 2009-039176 filed on Feb. 23, 2009, including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A pressure sensor comprising:
   a substrate;
   a pressure reception plate which is provided in a state of facing the substrate, the pressure reception plate comprising in a surface which faces the substrate, a low reflection region, and a high reflection region having a relatively higher reflection ratio compared to the low reflection region;
   a support portion to change a distance between the substrate and the pressure reception plate when a pressure is applied to the pressure reception plate, the support portion being provided in between the substrate and the pressure reception plate; and
   a plurality of light receiving elements which are respectively provided on the substrate in positions facing the low reflection region of the pressure reception plate and in positions facing the high reflection region of the pressure reception plate.

2. The pressure sensor as claimed in claim 1, wherein the plurality of light receiving elements are arranged to be in a state of a matrix on the substrate.

3. The pressure sensor as claimed in claim 1, wherein the pressure reception plate comprises a high reflection member, and the low reflection region comprises a low reflection member.

4. The pressure sensor as claimed in claim 3, wherein the low reflection region is provided in a circular shape at a center portion of the surface in the pressure reception plate which faces the substrate.

5. The pressure sensor as claimed in claim 1, wherein the pressure reception plate comprises a low reflection member, and the high reflection region comprises a high reflection member.

6. The pressure sensor as claimed in claim 1, wherein an elastic modulus of the pressure reception plate is sufficiently larger than an elastic modulus of the support portion.

7. The pressure sensor as claimed in claim 1, further comprising a light source to emit a light to the plurality of light receiving elements, the light source being provided in a surface side where the plurality of light receiving elements are not formed on the substrate.

8. The pressure sensor as claimed in claim 7, wherein the light source is a surface-emitting light source.

9. The pressure sensor as claimed in claim 1, wherein the substrate comprises a member having a translucency,
and wherein each of the light receiving element comprises:
a first electrode which is formed on the substrate, and which has a light blocking property;
a first insulation film which is formed on the first electrode and which is transparent;
a semiconductor film which is formed on the first insulation film in a state of facing the first electrode;
two impurity semiconductor films which are located separately from each other, both of which being attached to the semiconductor film;
a second electrode which is formed on one of the two impurity semiconductor films;
a third electrode which is formed on the other one of the two impurity semiconductor films;
a second insulation film which is transparent and which covers the semiconductor film, the impurity semiconductor films, the second electrode and the third electrode; and
a fourth electrode which is formed on the second insulation film in a state of facing the semiconductor film.

10. The pressure sensor as claimed in claim 9, further comprising:
a third insulation film which is transparent and which is formed on the fourth electrode; and
a fifth electrode which is transparent and which is formed on the third insulation film.

11. The pressure sensor as claimed in claim 10, wherein the fifth electrode is grounded.

12. A pressure measurement method of a pressure sensor, wherein the pressure sensor comprises:

a substrate;
a pressure reception plate which is provided in a state of facing the substrate, the pressure reception plate comprising a low reflection region and a high reflection region, respectively in a surface which faces the substrate;
a support portion to change a distance between the substrate and the pressure reception plate when a pressure is applied to the pressure reception plate, the support portion being provided in between the substrate and the pressure reception plate; and
a plurality of light receiving elements which are respectively provided on the substrate in positions facing the low reflection region of the pressure reception plate and in positions facing the high reflection region of the pressure reception plate,
wherein the pressure measurement method comprises:
applying a pressure on the pressure reception plate; and
measuring the pressure based on an amount of a light received by the light receiving element facing the low reflection region, and a light received by the light receiving element facing the high reflection region, according to a variation of the distance between the substrate and the pressure reception plate.

13. The pressure measurement method of the pressure sensor, as claimed in claim 12, wherein the larger the pressure against the pressure reception plate is, the more a compression amount in the support portion becomes, and shorter the distance between a lower surface of the pressure reception plate and an upper surface of the substrate becomes.

14. The pressure measurement method of the pressure sensor, as claimed in claim 12, wherein a light source emits a light to the plurality of light receiving elements, the light source being provided in a surface side where the plurality of light receiving elements are not formed on the substrate.

15. The pressure measurement method of the pressure sensor, as claimed in claim 12, wherein the substrate comprises a member having a translucency,
and wherein each of the light receiving element comprises:
a first electrode which is formed on the substrate, and which has a light blocking property;
a first insulation film which is formed on the first electrode and which is transparent;
a semiconductor film which is formed on the first insulation film in a state of facing the first electrode;
two impurity semiconductor films which are located separately from each other, both of which being attached to the semiconductor film;
a second electrode which is formed on one of the two impurity semiconductor films;
a third electrode which is formed on the other one of the two impurity semiconductor films;
a second insulation film which is transparent and which covers the semiconductor film, the impurity semiconductor films, the second electrode and the third electrode; and
a fourth electrode which is formed on the second insulation film in a state of facing the semiconductor film.

* * * * *